(12) United States Patent
Nerone et al.

(10) Patent No.: US 6,800,957 B2
(45) Date of Patent: Oct. 5, 2004

(54) ELECTRONIC DISTRIBUTION SYSTEM FOR 36V AUTOMOBILES

(75) Inventors: Louis R. Nerone, Brecksville, OH (US); Benito Trevino, Lyndhurst, OH (US)

(73) Assignee: General Electric Company, Schenectady, NY (US)

(*) Notice: Subject to any disclaimer, the term of this patent is extended or adjusted under 35 U.S.C. 154(b) by 345 days.

(21) Appl. No.: 09/777,988

(22) Filed: Feb. 6, 2001

(65) Prior Publication Data

US 2002/0105227 A1 Aug. 8, 2002

(51) Int. Cl.$^7$ .............................. H02H 1/00; B60L 1/00
(52) U.S. Cl. ..................................... 307/9.1; 363/178
(58) Field of Search .............................. 307/9.1, 10.1, 307/38, 40; 340/310.01, 310.06; 363/178

(56) References Cited

U.S. PATENT DOCUMENTS

| | | | | |
|---|---|---|---|---|
| 4,075,699 A | * | 2/1978 | Schneider et al. ........... 700/291 |
| 4,204,127 A | * | 5/1980 | Carter, II ..................... 307/39 |
| 4,302,841 A | * | 11/1981 | McCulloch ................. 714/823 |
| 4,360,881 A | * | 11/1982 | Martinson .................. 700/298 |
| 4,370,563 A | * | 1/1983 | Vandling et al. ............. 307/40 |
| 4,463,341 A | * | 7/1984 | Iwasaki ................. 340/310.01 |
| 4,471,232 A | * | 9/1984 | Peddie et al. ................. 307/35 |
| 4,538,262 A | * | 8/1985 | Sinniger et al. ........... 307/10.1 |
| 4,639,609 A | * | 1/1987 | Floyd et al. ............... 307/10.1 |
| 4,661,718 A | * | 4/1987 | Matsumoto et al. ....... 307/10.1 |
| 4,731,547 A | * | 3/1988 | Alenduff et al. .............. 307/85 |
| 4,736,367 A | * | 4/1988 | Wroblewski et al. ...... 307/10.1 |
| 4,785,195 A | * | 11/1988 | Rochelle et al. .............. 307/18 |
| 4,794,269 A | * | 12/1988 | Kawata et al. ............. 307/10.1 |
| 4,839,530 A | * | 6/1989 | Greenwood ................ 307/10.1 |
| 4,847,782 A | * | 7/1989 | Brown et al. ............... 700/296 |
| 4,907,222 A | * | 3/1990 | Slavik ........................ 370/443 |
| 4,990,908 A | * | 2/1991 | Tung ..................... 340/825.63 |
| 5,107,184 A | * | 4/1992 | Hu et al. ..................... 315/291 |
| 5,121,386 A | * | 6/1992 | Wolfsgruber et al. ....... 370/462 |
| 5,142,278 A | * | 8/1992 | Moallemi et al. ........... 340/436 |
| 5,191,520 A | * | 3/1993 | Eckersley ..................... 363/72 |
| 5,293,632 A | * | 3/1994 | Novakovich et al. ....... 713/324 |
| 5,363,405 A | * | 11/1994 | Hormel ....................... 307/9.1 |
| 5,371,453 A | * | 12/1994 | Fernandez .................. 320/136 |
| 5,397,926 A | * | 3/1995 | Matsui et al. ................. 307/32 |
| 5,404,300 A | * | 4/1995 | Sugiura ........................ 701/49 |
| 5,432,817 A | * | 7/1995 | Hormel et al. .............. 375/257 |
| 5,477,091 A | | 12/1995 | Fiorina et al. |
| 5,504,737 A | * | 4/1996 | Ichii et al. ................. 307/10.1 |
| 5,532,914 A | * | 7/1996 | Kageyama et al. ........... 363/50 |
| 5,533,061 A | * | 7/1996 | Smith et al. ................ 375/334 |
| 5,581,246 A | * | 12/1996 | Yarberry et al. ....... 340/825.57 |

(List continued on next page.)

FOREIGN PATENT DOCUMENTS

| DE | 197 51 910 C | * | 3/1999 | ........... B60R/21/32 |
|---|---|---|---|---|

OTHER PUBLICATIONS

US 5,742,027, 4/1998, Malville (withdrawn)*

Primary Examiner—Gregory J. Toatley, Jr.
(74) Attorney, Agent, or Firm—Pearne & Gordon LLP

(57) ABSTRACT

An electrical power conversion system for converting power from one voltage to another, especially for converting a higher-voltage, direct current electrical power system, such as a thirty-six volt to forty-two volt (36V–42V) direct current system for vehicles, into a voltage acceptable for powering lower voltage equipment, such as those using twelve volt to fourteen volt (12V–14V) DC vehicle electrical power systems is disclosed. The invention provides the ability to control the operating states of the loads by coupling a control signal to the vehicle's electrical power bus. The invention can take advantage of current or future DC-to-AC inverter or DC-to-DC converter technology and anticipated vehicle electrical systems to devise a electrical power conversion and control system meeting the needs of various vehicle loads.

20 Claims, 3 Drawing Sheets

U.S. PATENT DOCUMENTS

| | | | | |
|---|---|---|---|---|
| 5,673,876 A | * | 10/1997 | Lumbis et al. | 246/169 R |
| 5,689,421 A | * | 11/1997 | Gornig | 370/10.1 |
| 5,745,027 A | * | 4/1998 | Malville | 340/310.01 |
| 5,751,150 A | * | 5/1998 | Rippel et al. | 324/537 |
| 5,757,265 A | * | 5/1998 | Kogure et al. | 340/310.01 |
| 5,760,489 A | * | 6/1998 | Davis et al. | 307/10.1 |
| 5,783,872 A | * | 7/1998 | Blair | 307/46 |
| 5,821,632 A | * | 10/1998 | Normann et al. | 307/10.1 |
| 5,856,710 A | * | 1/1999 | Baughman et al. | 307/10.1 |
| 5,901,070 A | * | 5/1999 | Trainor | 700/298 |
| 5,945,879 A | | 8/1999 | Rodwell et al. | |
| 5,962,991 A | * | 10/1999 | Levy | 315/312 |
| 5,982,052 A | * | 11/1999 | Sosnowski | 307/126 |
| 5,986,539 A | * | 11/1999 | Johansson et al. | 340/310.01 |
| 6,006,143 A | * | 12/1999 | Bartel et al. | 701/1 |
| 6,031,749 A | * | 2/2000 | Covington et al. | 363/98 |
| 6,046,511 A | * | 4/2000 | Kincaid | 307/10.1 |
| 6,049,296 A | * | 4/2000 | Lumbis et al. | 340/933 |
| 6,067,482 A | * | 5/2000 | Shapiro | 700/286 |
| 6,070,114 A | * | 5/2000 | Fendt et al. | 701/45 |
| 6,091,779 A | * | 7/2000 | Griessbach | 307/10.1 |
| 6,121,692 A | * | 9/2000 | Michaels et al. | 307/10.1 |
| 6,127,742 A | * | 10/2000 | Weynachter | 307/38 |
| 6,127,939 A | * | 10/2000 | Lesesky et al. | 307/10.1 |
| 6,130,487 A | * | 10/2000 | Bertalan et al. | 307/9.1 |
| 6,163,089 A | * | 12/2000 | Kull | 307/151 |
| 6,166,453 A | * | 12/2000 | Kon'i et al. | 307/10.1 |
| 6,172,619 B1 | * | 1/2001 | Lumbis et al. | 307/10.1 |
| 6,188,314 B1 | * | 2/2001 | Wallace et al. | 340/310.01 |
| 6,212,457 B1 | * | 4/2001 | Miciuda et al. | 307/10.1 |
| 6,229,434 B1 | * | 5/2001 | Knapp et al. | 340/310.01 |
| 6,229,435 B1 | * | 5/2001 | Knapp et al. | 340/425.5 |
| 6,275,167 B1 | * | 8/2001 | Dombrowski et al. | 340/825.57 |
| 6,282,668 B1 | * | 8/2001 | Neudecker | 307/10.1 |
| 6,301,528 B1 | * | 10/2001 | Bertram et al. | 307/9.1 |
| 6,310,408 B1 | * | 10/2001 | Hermann | 307/10.1 |
| 6,384,489 B1 | * | 5/2002 | Bluemel et al. | 307/10.1 |
| 6,404,150 B1 | * | 6/2002 | Nehl et al. | 318/34 |
| 6,459,170 B1 | * | 10/2002 | Tamai et al. | 307/48 |
| 6,459,175 B1 | * | 10/2002 | Potega | 307/149 |
| 6,469,404 B1 | * | 10/2002 | Pohjola | 307/10.1 |
| 6,476,709 B1 | * | 11/2002 | Wuidart et al. | 340/310.01 |
| 6,477,457 B1 | * | 11/2002 | Fendt et al. | 280/735 |
| 6,492,745 B1 | * | 12/2002 | Colley et al. | 307/66 |
| 6,496,104 B2 | * | 12/2002 | Kline | 340/310.01 |
| 6,496,105 B2 | * | 12/2002 | Fisher et al. | 340/310.01 |
| 6,512,307 B1 | * | 1/2003 | Ilg | 307/9.1 |
| 6,525,915 B1 | * | 2/2003 | Graube | 361/58 |
| 6,528,899 B1 | * | 3/2003 | Saito et al. | 307/10.1 |
| 6,529,127 B2 | * | 3/2003 | Townsend et al. | 340/505 |
| 6,570,493 B1 | * | 5/2003 | Rotem | 340/310.01 |
| 6,577,022 B2 | * | 6/2003 | Joong et al. | 290/40 C |
| 6,624,533 B1 | * | 9/2003 | Swanson et al. | 307/64 |
| 6,690,585 B2 | * | 2/2004 | Betts-LaCroix | 363/16 |

* cited by examiner

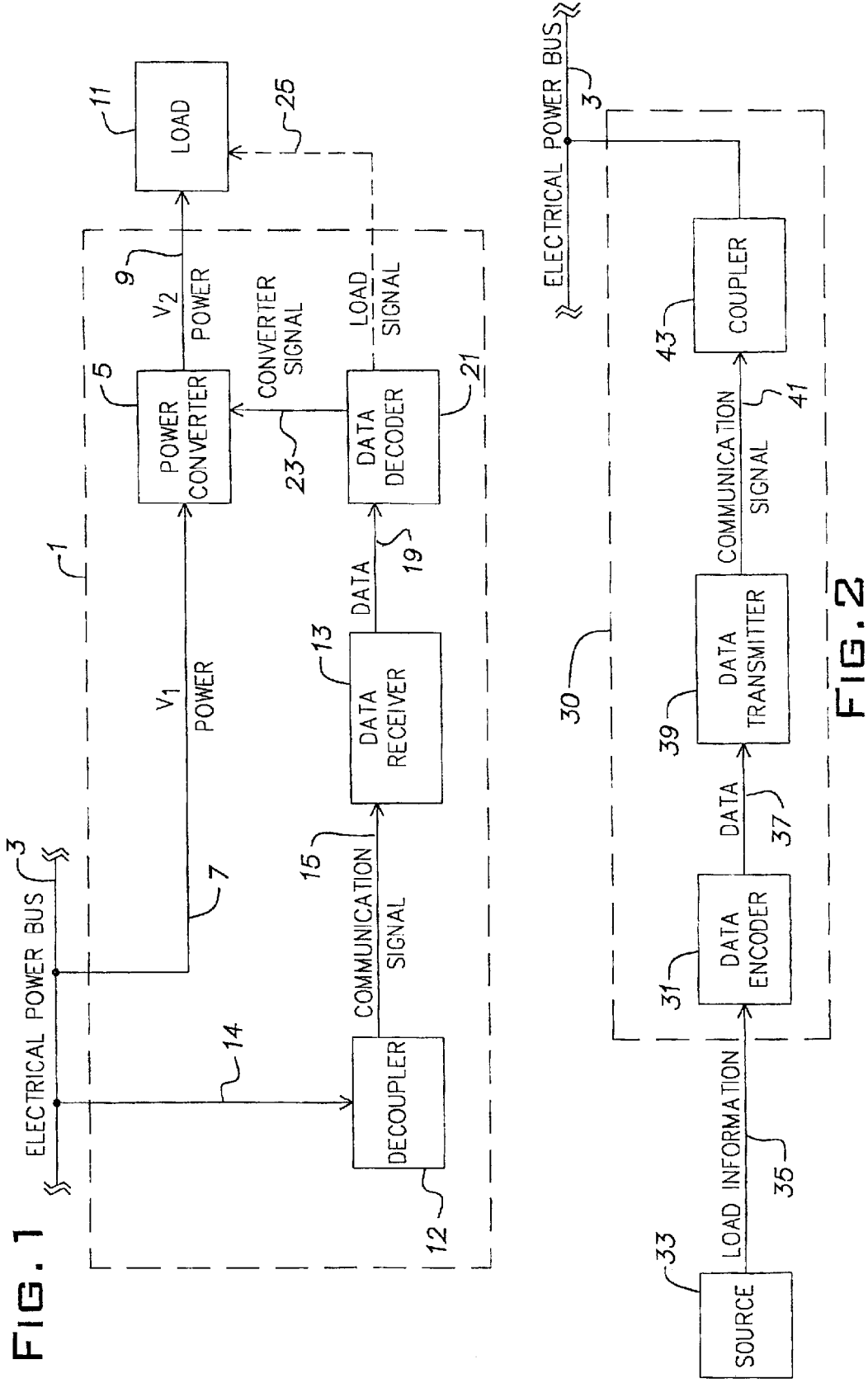

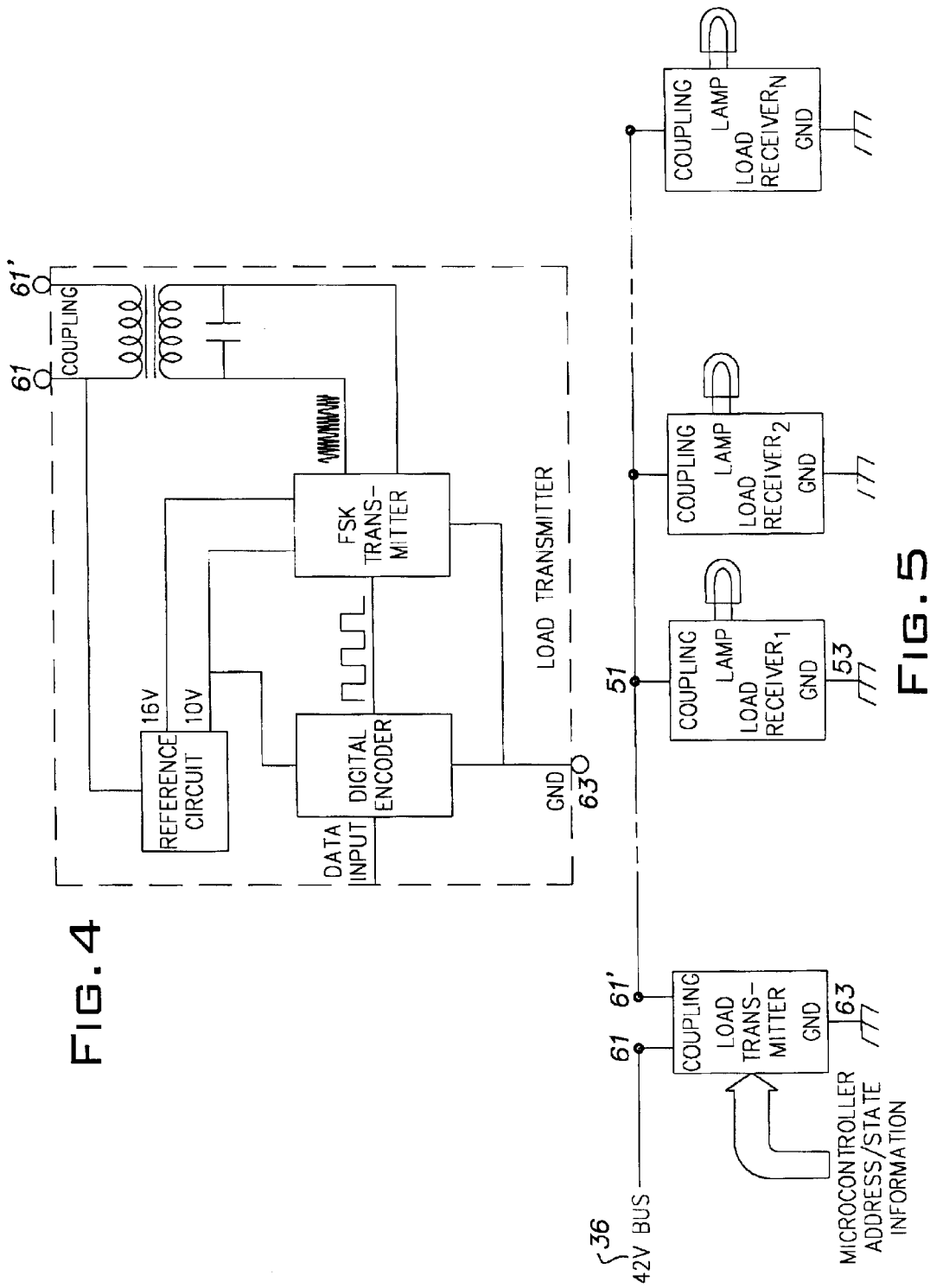

ELECTRONIC DISTRIBUTION SYSTEM FOR 36V AUTOMOBILES

BACKGROUND OF THE INVENTION

The present invention relates generally to electrical power conversion systems, and, more specifically, to providing a means to operate twelve volt to fourteen volt (12V–14V) equipment off of a vehicle electrical power system operating at a different voltage with the additional ability to control the operating states/parameters of a load using the vehicle's existing electrical power bus as a communication medium.

Electrical power demands on automobiles and other vehicle electrical systems have been growing due to increasing requirements for electrical power by peripheral equipment and by the vehicle components themselves. This is because vehicle manufacturers are not only increasingly adding electrically powered features for convenience, but manufacturers are also increasingly replacing mechanically, hydraulically, and pneumatically powered components with electrically powered components, typically with the intent to increase both vehicle performance and component reliability while also reducing total vehicle weight. Increasing computerization of vehicles has also tended to increase the electrical power requirements of vehicle power systems.

However, conventional vehicle electrical systems, many of which operate at fourteen volts (14V) DC while running and use twelve volt (12V) batteries for starting, often cannot keep up with the anticipated electrical demands. This is partly due to the fact that low voltage systems require high current capacity when compared to higher voltage systems. High current capacity, in turn, requires a heavier gauge wiring system to accommodate the higher currents, which could lead to heavier wiring harnesses and larger resistive heat losses. These shortcomings could make conventional vehicle electrical systems unsatisfactory for many modern vehicles, and may lead to the need for higher-voltage electrical power systems.

To respond to these changing circumstances, vehicle manufacturers have explored different electrical system standards. One standard is a forty-two volt (42V) DC electrical power system while operating, but using a thirty-six volt (36V) battery for starting the vehicle engine or operating equipment while the engine is not running. Such higher-voltage systems might reduce wiring harness size and may increase the total electrical power available for practical vehicle use.

For many different reasons, some loads on a thirty-six volt to forty-two volt (36V–42V) electrical power system may continue to require power at about twelve volts to fourteen volts (12V–14V). For example, experience has shown that thicker twelve volt (12V) light bulb filaments are often more durable than the thinner higher voltage light bulb filaments, which are consequently often less rugged. Accordingly, there is a need in the art for a means of providing twelve volts to fourteen volts (12–14V) electrical power to vehicle components when the vehicle electrical power bus operates at a different voltage.

SUMMARY OF THE INVENTION

The present invention provides an electrical power conversion system for delivering electrical power to a load by converting electrical power received from an electrical power bus at a first voltage ($V_1$) into electrical power at a second voltage ($V_2$) to power the load. The system also provides a means to control the states and/or operating parameters of the load.

A load transmitter is used to output a communication signal containing encoded load information coupled onto the electrical power bus to control a load receiver or the load itself. The encoded load information may be made up of the desired load state, status, and address. The load transmitter is comprised of: a data encoder, which encodes the desired load state and address information into a data output; a data transmitter, which receives the data and transmits a communication signal; and a coupler, which then couples the communication signal onto the electrical power bus.

A load receiver is used to control the load and to convert the electrical power bus power provided at a first voltage ($V_1$) into a load electrical power output at a second voltage ($V_2$). The load receiver is comprised of a decoupler, which decouples the communication signal from the electrical power bus and isolates the load receiver from the electrical power bus; a data receiver, which receives the communication signal and which derives the encoded data therefrom; a data decoder to decode the encoded data and convert it into a converter signal; and a power converter, which receives the converter signal from the data decoder. The state or operating condition of the load can then be set via the converter signal, according to the desired load state and address information. The power converter also converts the electrical power from the electrical power bus at the first voltage ($V_1$) into power at the second voltage ($V_2$) for powering a load or load subsystem.

The load state, status, and address information may be used to identify and locate the load (or the associated power converter) and/or to set the load operating states or conditions (or the states and conditions of the associated power converter).

In this way, the electrical power system can feed loads at a second voltage ($V_2$) when provided with an electrical power bus at a first voltage ($V_1$), and the state of a load can be controlled.

BRIEF DESCRIPTION OF THE DRAWINGS

These and other features and advantages of the present invention will be apparent with reference to the following description taken in conjunction with the accompanying drawings, wherein:

FIG. 1 is a block diagram showing the basic elements of the load receiver that connects to the vehicle electrical power bus and to a load.

FIG. 2 is a block diagram showing the basic elements of the load transmitter that receives inputs from a source and transmits them onto the electrical power bus.

FIG. 4 is a block diagram showing a possible embodiment of the load transmitter.

FIG. 5 is a block diagram showing a possible use of the invention utilizing a single load transmitter and multiple load receivers, all connected via a 42 volt vehicle electrical bus.

DETAILED DESCRIPTION OF PREFERRED EMBODIMENTS OF THE INVENTION

Figures 3A, 3B:
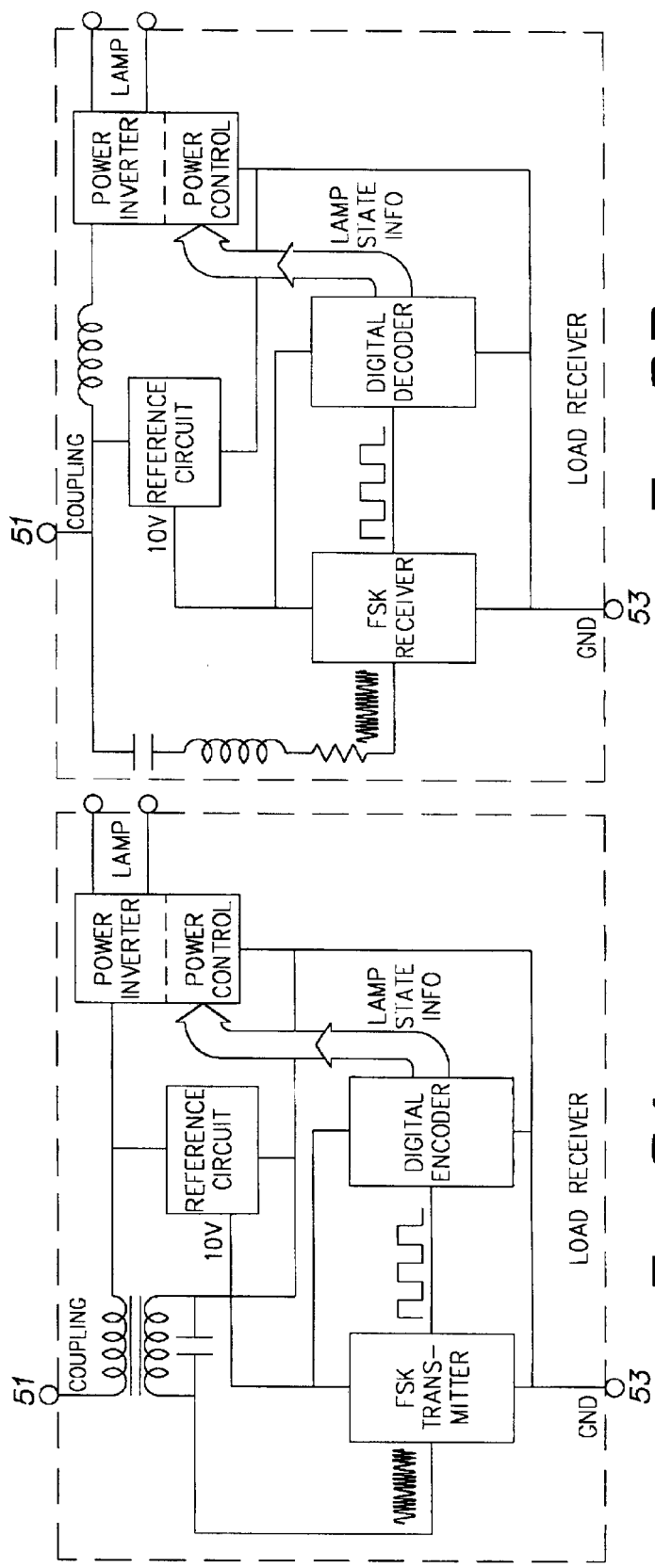
FIG. 3A and FIG. 3B are block diagrams showing alternate possible embodiments of a load receiver.

The present invention relates generally to electrical power conversion systems for vehicles, and, more specifically, to providing a means to operate twelve volt to fourteen volt (12V–14V) equipment off of a vehicle electrical power system operating at a different voltage, such as a thirty-six volt to forty-two volt (36V to 42V) DC system, with the additional capability of controlling the operating state of a load using the vehicle's existing electrical power bus as a communication means.

FIG. 1 illustrates the load receiver 1 of the electrical power conversion system, according to one possible embodiment of the invention. An electrical power bus 3 provides electrical power at a first voltage ($V_1$) to a power converter 5 via a power converter input 7. The power converter 5 may be, for example, a commercially available direct-current to alternating-current (DC-to-AC) inverter or, alternatively, the power converter 5 may be a commercially available direct-current to direct-current (DC-to-DC) converter. The power converter 5 has a power output 9 which provides electrical power at a second voltage ($V_2$) to a load 11. For example, the power converter 5 may utilize an input from a higher-voltage vehicle electrical power bus 3, such as a thirty-six volts to forty-two volts direct current (36VDC–42VDC) automobile electrical system which utilizes a thirty-six volt (36V) battery and a forty-two volt (42V) system bus. The power converter could then provide a lower voltage power output 9, such as approximately twelve volts to fourteen volts (12V–14V). Such a system could be used to supply, for example, approximately twelve volts to fourteen volts (12V–14V) power to various loads that utilize this lower voltage. The power output 9 of the power converter 5 might be a DC voltage or an AC voltage, depending on the specific needs of the particular loads or the commercial availability of components and their relative costs.

A decoupler 12 of FIG. 1 decouples a communication signal from the electrical power bus 3 via its input 14. The data receiver 13 receives a communication signal 15 from the decoupler 12, and outputs data 19 derived from the communication signal. The data 19 is input to a data decoder 21, which decodes the encoded data, and outputs a converter signal 23 that is input to the power converter 5. The actual values of the converter signal 23 may depend on address information that may be used, for example, to determine whether or not the converter is powering a load (or load subsystem) assigned to that address. This enables each load (or load subsystem) to be uniquely identified by an address. The converter signal 23 could be used, for example, to set the state of the load 11 associated with that power converter 5. Load states, discussed hereinbelow, might include such activities as turning the load on or off, for example, by controlling the output of the power converter 5. Alternatively, a load signal 25 could be sent directly to the load 11 for controlling the load states and/or operating parameters directly. Still another embodiment might include a control signal output (not shown) from the power converter 5 to the load 1 to control the operation of the load 11.

As an alternative, the system could also be designed to allow communication from the load back to a using or controlling device or person (not shown). The power converter 5 could provide a status information to a data encoder (not shown), or to the data decoder 21, which could then also act as a data encoder. The encoded data would then be input to a data transmitter (not shown), or to the data receiver 13 which could then also act as a data transmitter, which would then convert the encoded data into a communication signal input to a coupler, or to the decoupler 12 which would then also act as a coupler, for transmittal onto the electrical power bus 3. Alternatively, the load 11 could directly provide status information to the data encoder in a similar manner.

FIG. 2 illustrates the load transmitter 30 as part of the electrical power conversion system. The load transmitter 30 is used for transmitting a communication signal containing the load state and address information and any other desired load information onto the electrical power bus to control the power converter and/or the loads. The desired load information 35 is entered from a source 33 into a data encoder 31 wherein the data is encoded.

The load information might include various load states, such as "on" or "off", and it could also include operating states, for example, such as "low" or "high" for a vehicle headlight. The actual load states used and transmitted by the invention would depend on the actual operating states of the loads. The load information may include the address of the load, so that each load and/or load converter can be uniquely identified and controlled. The load address might be supplied by the using device or person, or it may be derived or implied by the source 33, or even determined in some other manner. The source 33 might be a switch, a user input device, a controller, a computer, or some other device, for example. Thus, a source can enter commands and desired states into the data transmitter 30 which are then communicated to the various data receivers, and thus the operation of the load can be controlled.

The encoded data 37 is then input to a data transmitter 39. The communication signal 41 of the data transmitter 39 is input to a coupler 43, which then couples the signal onto the electrical power bus 3, and thus the signal is made available to any load receiver units attached to the electrical power bus 3.

Alternatively, the system might utilize a communication bus separate from the vehicle electrical power bus, which might be provided as part of the vehicle itself, and thus invention could control the load states using the communication bus, rather than coupling the communication signal with the electrical power bus.

FIGS. 3A, 3B, 4 and 5 illustrate some specific embodiments of the invention as used, to power twelve volt (12V) lamps in a vehicle implementation using the electrical power bus for both electrical power, and to provide a communication path. The load receiver devices shown in FIGS. 3A and 3B are alternative embodiments that perform the functions described for FIG. 1 and the load transmitter device performs the functions described for FIG. 2. Multiple receivers can be utilized to power and/or control multiple loads, as is shown in one embodiment, for example, by FIG. 5.

The embodiments of FIGS. 3A, 3B and 4 utilize a Phase Locked Loop (PLL) configured as a Frequency Shift Keying (FSK) receiver (such as the HEF4046B) and a carrier current transceiver configured as a FSK transmitter (such as the LM893). It also utilizes a digital encoder and decoder pair (such as the MC145027 and MC145026) The power converter can be a DC-to-AC inverter with a power control interface to control the load states via the input from the digital decoder. Such a power converter could be chosen from a number of commercially available units. A DC-to-DC converter can also be used as an alternative power converter. A reference circuit is shown to provide a reference voltage for the chosen components. FIGS. 3A and 3B differ in the implementation of the decoupler used in the load receiver for coupling the FSK receiver to the vehicle's electrical power bus.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrical power conversion system for a vehicle, comprising:
    a load receiver for powering and controlling a vehicle load, said load receiver comprising:
        a decoupler for decoupling a communication signal from a vehicle DC electrical power bus, said communication signal containing encoded load information, wherein the decoupler electrically isolates the communication signal from the power bus;
        a data receiver for receiving the communication signal from the decoupler and deriving load data therefrom;
        a data decoder for decoding the load data received from the data receiver and converting the load data to a converter signal according to the encoded load information;
        and a power converter for receiving the converter signal from the data decoder for controlling an operation of one or both of the converter and the load, wherein the power converter converts an electrical power bus input of a first voltage into a power output at a second voltage for powering the vehicle load.

2. An electrical power conversion system according to claim 1, further comprising:
    a load transmitter for transmitting encoded vehicle load information in a transmitted communication signal onto the electrical power bus, said load transmitter comprising:
        a data encoder for encoding the vehicle load information into load data;
        a data transmitter for receiving the load data from the data encoder and generating and transmitting the communication signal; and
        a coupler for receiving the communication signal from the data transmitter and coupling the communication signal onto the vehicle DC electrical power bus.

3. An electrical power conversion system according to claim 1, wherein:
    the load-information contains load state and load address information; and further wherein
    the power converter sets the state of the vehicle load according to the converter signal when the power converter is powering the vehicle load associated with that load address.

4. An electrical power conversion system according to claim 2, wherein
    the load-information contains load state and load address information; and further wherein
    the power converter sets the state of the vehicle load according to the converter signal when the power converter is powering the vehicle load associated with that load address.

5. An electrical power conversion system according to claim 2 further comprising:
    a data encoder for encoding return load information from one or both of the power converter and the load into load data;
    a load return transmitter for generating and transmitting a return communication signal from the return load data from the data encoder; and
    a second coupler for coupling the return communication signal received from the load return transmitter to the vehicle DC electric power bus.

6. An electrical power conversion system according to claim 5, wherein
    the load information contains vehicle load state and load address information; and further wherein
    the power converter sets the state of the vehicle load according to the converter signal when the power converter is powering the vehicle load associated with that load address.

7. An electrical power conversion system according to claim 1 for powering vehicle loads, wherein the first voltage is about thirty-six volts to forty-two volts (36V–42V) and the second voltage is about twelve volts to fourteen volts (12V–14V).

8. An electrical power conversion system according to claim 2 for powering vehicle loads, wherein the first voltage is about thirty-six volts to forty-two volts (36V–42V) and the second voltage is about twelve volts to fourteen volts (12V–14V).

9. An electrical power conversion system according to claim 3 for powering vehicle loads, wherein the first voltage is about thirty-six volts to forty-two volts (36V–42V) and the second voltage is about twelve volts to fourteen volts (12V–14V).

10. An electrical power conversion system according to claim 4 for powering vehicle loads, wherein the first voltage is about thirty-six volts to forty-two volts (36V–42V) and the second voltage is about twelve volts to fourteen volts (12V–14V).

11. An electrical power conversion system according to claim 5 for powering vehicle loads, wherein the first voltage is about thirty-six volts to forty-two volts (36V–42V) and the second voltage is about twelve volts to fourteen volts (12V–14V).

12. An electrical power conversion system according to claim 6 for powering vehicle loads, wherein the first voltage is about thirty-six volts to forty-two volts (36V–42V) and the second voltage is about twelve volts to fourteen volts (12V–14V).

13. An electrical power conversion system for powering vehicle loads, comprising:
    a load transmitter for transmitting encoded load information in a communication signal onto a vehicle electrical power bus operating at about thirty-six volts to forty-two volts (36V–42V) DC, said load transmitter comprising:
        a data encoder for encoding load state and load address information into encoded data;
        a frequency shift keying transmitter for receiving the encoded data from the data encoder and transmitting the encoded data as an FSK communication signal; and
        a coupler for coupling the FSK communication signal onto the vehicle electrical power bus; and
    a load receiver for controlling vehicle loads and providing said vehicle loads with electrical power at about twelve volts to fourteen volts (12V–14V), said load receiver comprising:
        a decoupler for decoupling the FSK communication signal from the vehicle electrical power bus, said FSK communication signal containing the encoded load state and load address information, wherein the decoupler electrically isolates the FSK communication signal from the power signal;
        a frequency shift keying receiver for receiving the FSK communication signal from the decoupler and deriving encoded data from the FSK communication signal;

a data decoder for decoding the encoded data received from the frequency shift keying receiver and converting the encoded data into a converter signal according to the decoded load state and load address information; and a power converter for converting the vehicle electrical bus power signal of about thirty-six volts to forty-two volts (36V–42V) DC into a load power output equivalent to about twelve volts to fourteen volts (12V–14V) for powering vehicle electrical loads, wherein the power converter sets the state of the load in accordance with the converter signal when the power converter is powering the load associated with that load address.

14. An electrical power conversion system for a vehicle electrical system according to claim 13, wherein the power converter contains a DC-to-DC converter.

15. An electrical power conversion system for a vehicle electrical system according to claim 13, wherein the power converter contains a DC-to-AC inverter.

16. An electrical power conversion system for powering vehicle loads, comprising:

a load transmitter for transmitting encoded load information in a communication signal onto a vehicle electrical power bus operating at about thirty-six volts to forty-two volts (36V–42V) DC, said load transmitter comprising:

a data encoder for encoding load state information and load address information into encoded data; and a frequency shift keying transmitter for receiving the encoded data from the data encoder and transmitting the encoded data as an FSK communication signal onto a vehicle communication bus; and a load receiver for controlling vehicle loads and providing said vehicle loads with electrical power at about twelve volts to fourteen volts (12V–14V), said load receiver comprising:

a frequency shift keying receiver for receiving the communication signal from the vehicle communication bus and deriving encoded data from the FSK communication signal;

a data decoder for decoding the encoded data received from the frequency shift keying receiver and converting the encoded data into a converter signal according to the decoded load state and load address information; and a power converter for converting the vehicle electrical bus power signal of about thirty-six volts to forty-two volts (36V–42V) DC into a load power output equivalent to about twelve volts to fourteen volts (12V–14V) for powering vehicle electrical loads, wherein the power converter sets the state of the load in accordance with the converter signal when the power converter is powering the load associated with that load address.

17. An electrical power conversion system for a vehicle electrical system according to claim 16, wherein the power converter contains a DC-to-DC converter.

18. An electrical power conversion system for a vehicle electrical system according to claim 16, wherein the power converter contains a DC-to-AC inverter.

19. An electrical power conversion system for a vehicle, comprising:

a power converter connected to a vehicle electrical power bus that provides DC current, said power converter for converting the bus voltage into a load voltage different from the bus voltage, said load voltage for powering a vehicle load; and a data receiver for receiving an encoded communication signal from the electrical power bus, said encoded communication signal including encoded load information for controlling an operation of one or both of said power converter and said vehicle load.

20. The electrical power conversion system of claim 19, further comprising a data decoder for decoding the encoded communication signal and converting said communication signal to a control signal for said controlling an operation of one or both of said power converter and said load, wherein said controlling is done according to said load information.

* * * * *